(12) United States Patent
Jin et al.

(10) Patent No.: US 10,716,001 B2
(45) Date of Patent: Jul. 14, 2020

(54) SELF-PROVISIONING OF MOBILE DEVICES IN DEPLOYABLE MOBILE TELECOMMUNICATIONS NETWORKS

(71) Applicant: Star Solutions International Inc., Richmond (CA)

(72) Inventors: Yichuang Jin, Vancouver (CA); Ron McLeod, Richmond (CA)

(73) Assignee: STAR SOLUTIONS INTERNATIONAL INC., Richmond (CA)

( * ) Notice: Subject to any disclaimer, the term of this patent is extended or adjusted under 35 U.S.C. 154(b) by 442 days.

(21) Appl. No.: 15/676,009

(22) Filed: Aug. 14, 2017

(65) Prior Publication Data

US 2019/0053050 A1    Feb. 14, 2019

(51) Int. Cl.
*H04W 12/06* (2009.01)
*H04L 9/32* (2006.01)
(Continued)

(52) U.S. Cl.
CPC .......... *H04W 12/06* (2013.01); *H04L 9/0897* (2013.01); *H04L 9/3234* (2013.01);
(Continued)

(58) Field of Classification Search
CPC ... H04W 12/06; H04W 12/0023; H04W 4/90; H04W 8/18; H04L 9/0897;
(Continued)

(56) References Cited

U.S. PATENT DOCUMENTS

| 8,412,930 B2 * | 4/2013 | Gbadegesin | ........ H04L 63/0807 |
| | | | 713/159 |
| 2016/0127340 A1 * | 5/2016 | Upp | ...................... G06F 16/951 |
| | | | 726/7 |

(Continued)

FOREIGN PATENT DOCUMENTS

CA    2894990 A1    12/2016

*Primary Examiner* — Kambiz Zand
*Assistant Examiner* — Mirza Israr Javed
(74) *Attorney, Agent, or Firm* — McDonnell Boehnen Hulbert & Berghoff LLP

(57) ABSTRACT

Systems and methods for self-provisioning of mobile devices in a deployable telecommunications network are disclosed. A telecommunications network may include an enhanced provisioning server for recording and maintaining user data and authentication information associating users with applications of the network, and for generating secure, transportable user credentials that carry the user data and authentication information on a per-user basis. An enhanced deployable mobile communication system may include local versions of the applications, as well as a local subscriber database and provisioning server. The enhanced deployable mobile system securely import individual user data and authentication information from a user's transportable credentials, and use the imported data to provision the user in the deployable mobile system. Multiple deployable systems may be used, each enabling individual users to self-provision. Each may function as a standalone mobile network even in the absence of connectivity to a core telecommunications network.

20 Claims, 10 Drawing Sheets

(51) Int. Cl.
  *H04L 12/24*    (2006.01)
  *H04L 9/08*     (2006.01)
  *H04W 4/90*     (2018.01)
  *H04W 12/00*    (2009.01)
  *H04W 8/18*     (2009.01)

(52) U.S. Cl.
  CPC ........... *H04L 41/0806* (2013.01); *H04W 4/90* (2018.02); *H04W 12/0023* (2019.01); *H04L 2209/72* (2013.01); *H04L 2209/80* (2013.01); *H04W 8/18* (2013.01)

(58) Field of Classification Search
  CPC ............... H04L 41/0806; H04L 9/3234; H04L 2209/72; H04L 2209/80
  See application file for complete search history.

(56) References Cited

U.S. PATENT DOCUMENTS

2016/0234020 A1\* 8/2016 Nix ..................... H04W 8/082
2016/0294783 A1\* 10/2016 Piqueras Jover ... H04L 63/0442
2016/0316409 A1\* 10/2016 Upp ..................... H04W 12/04

\* cited by examiner

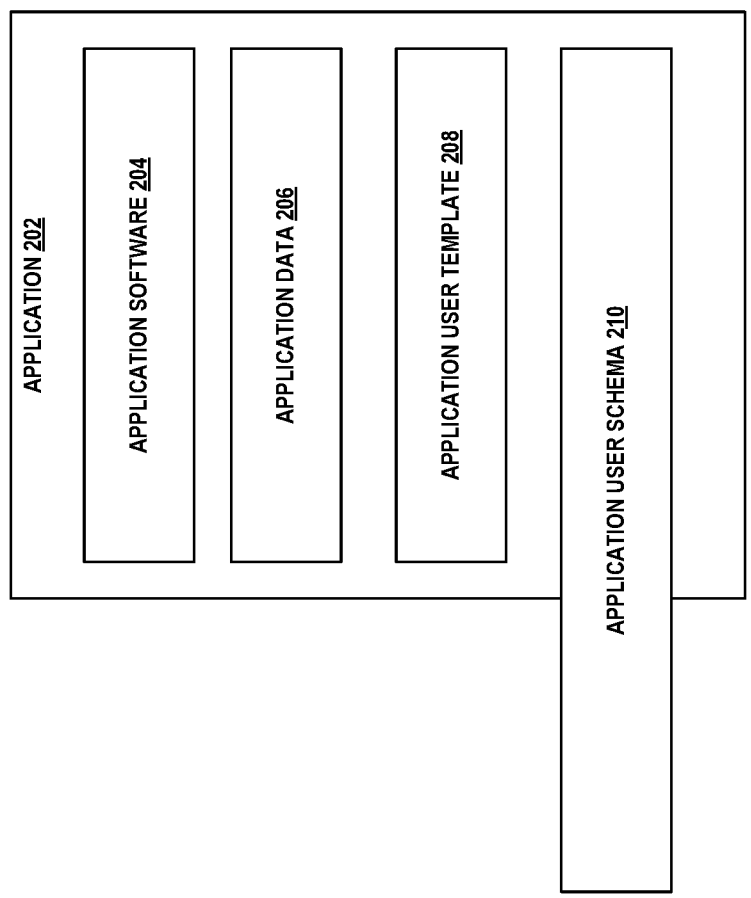

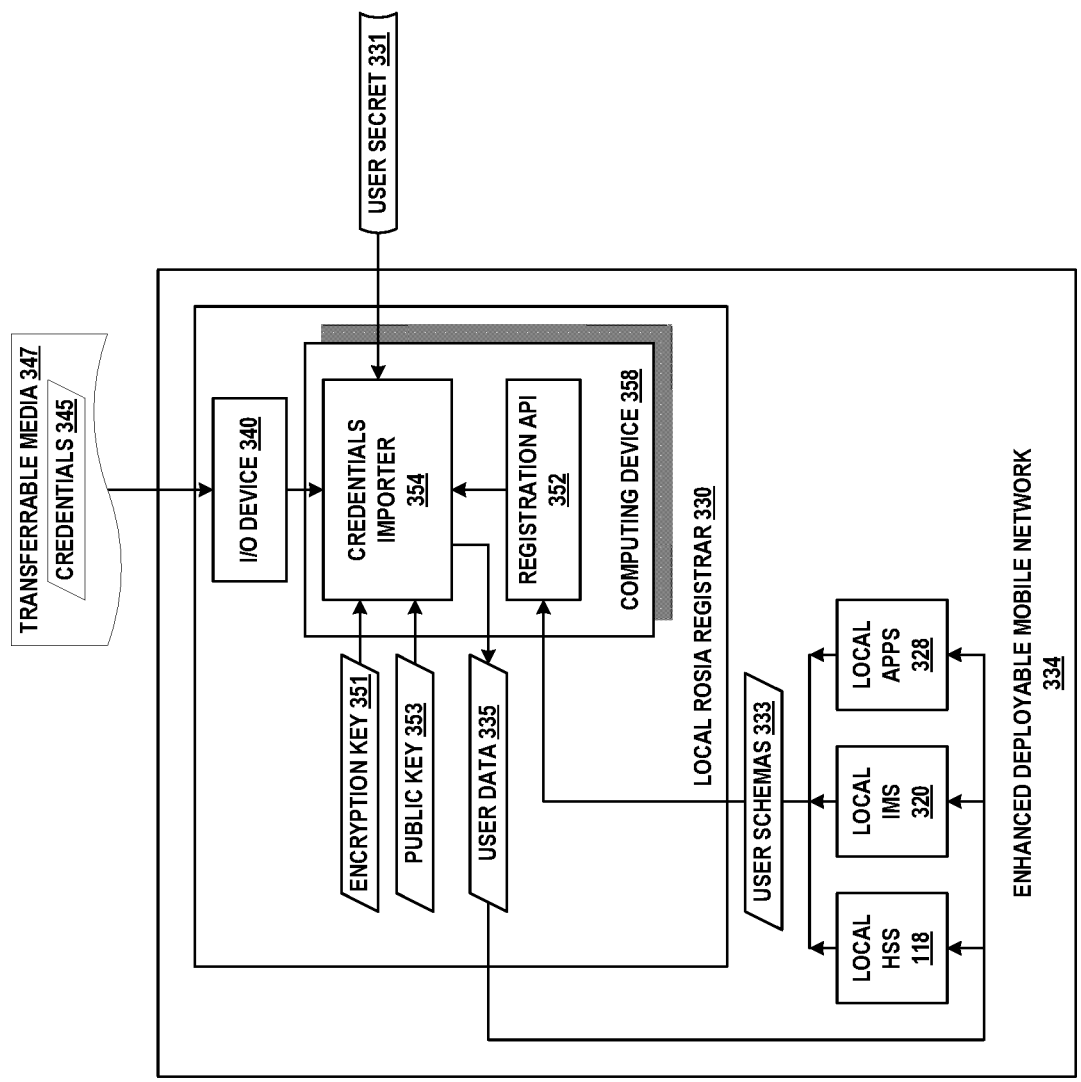

SELF-PROVISIONING OF MOBILE DEVICES IN DEPLOYABLE MOBILE TELECOMMUNICATIONS NETWORKS

BACKGROUND

Unless otherwise indicated herein, the materials described in this section are not prior art to the claims and are not admitted to be prior art by inclusion in this section.

Cellular wireless networks typically include a number of base stations that radiate to define wireless coverage areas, such as cells and/or cell sectors, in which user equipment devices (UEs) such as cell phones, "smart" phones, tablet computers, tracking devices, embedded wireless modules, and other wirelessly equipped communication devices, can operate. Each base station forms part of a Radio Access Network (RAN) that is coupled by a "backhaul" to a "core" network, which in turn provides connectivity with one or more transport networks, such as the public switched telephone network (PSTN) for voice communications and/or the Internet for voice and/or data communications, as well as data services, for instance.

In general, a wireless network operates in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), Universal Mobile Telecommunications Service (UMTS) among others. Each protocol defines its own procedures for registration of UEs, initiation of communications, allocation of bandwidth for UE communications, handoff/handover between coverage areas, and functions related to air interface communication.

When a UE enters into a cell or sector (or more generally, coverage area) of a base station, the UE may attach, register, or otherwise associate with the base station, and the base station may then serve the UE on one or more carriers. The base station may then be referred to as the UE's "serving" base station. In practice, the process of serving the UE may involve the serving base station allocating use of particular air interface resources, such as traffic channels or portions thereof, to carry data communications to and from the UE, and managing transmission on those resources, such as controlling what modulation scheme is used for the transmissions.

With this arrangement, a UE within the coverage area of the wireless network may engage in air interface communication with a base station. This arrangement enables UEs to communicate via the base station with various remote network entities or with other UEs served by the base station or by one or more other base stations.

A cellular wireless network is typically operated by a service provider that offers network access and service to users or subscribers. In order to ensure that only authorized UEs may gain access to a service provider's network and its services, various types of security techniques may be implemented. These may include a mutual authentication in which the network authenticates the UE and the UE authenticates the network. The network will also typically need to know "secret information" of a user or subscriber in order to be able to offer services.

A service provider may employ a centralized "Home Subscriber Server" ("HSS") in its core network for provisioning subscribers and their UEs, as well as maintaining a database of subscribers and their provisioned services. When a subscriber accesses the wireless network via the subscriber's UE, the HSS provides authentication "vectors" to a "Mobility Management Entity" ("MME"), which are used to authenticate the UE with the network, and to authenticate the network with the UE. The centralized HSS stores information regarding the subscriber's profile and one or more service attributes.

Cellular wireless networks are also used for public safety networks, either as standalone networks or overlaid on existing networks of service providers. A public safety network will typically have its own HSS for its personnel and their associated UEs, yet must also be able to operate under circumstances in which a RAN or part of a RAN loses connectivity with the core network (e.g., in the event of a natural disaster). In order to establish and/or maintain at least some level of operability when RAN-core connectivity is interrupted, public safety networks employ a form of portable network customarily referred to as a "deployable." Each deployable integrates the functionality of a RAN and many aspects of the core network, including a local HSS that duplicates the centralized HSS, in a standalone unit. When deployed in a geographic region where RAN-core connectivity has been lost, a deployable makes it possible for emergency personnel to authenticate their UEs with the cellular wireless network of the deployable (and vice versa), and thereby be afforded wireless communications within an area served by the deployable.

SUMMARY

In practice, a public safety network will employ multiple deployables in order to be able to provide services over multiple geographic regions that may be concurrently experiencing emergency-related and/or disaster-related cellular wireless service interruption. Deployables may also be used to provide coverage in regions having no existing wireless services, such as remote locations (e.g., some national parks, wilderness areas, etc.). Multiple deployables may also be able to communicate wirelessly with each other in order to provide emergency cellular wireless services over an area larger than the coverage area of just a single deployable. In order to support such services, each deployable must duplicate the service provisioning of the centralized core network. For example, the local HSS of each deployable must duplicate the centralized HSS.

In a conventional deployable, duplication of service provisioning among deployables is generally accomplished by a repetitive process of data synchronization. Thus, the HSS provisioning is duplicated to each deployable of a public safety organization by updating each local HSS. This conventional approach can be burdensome and inefficient, since changes—e.g., adding subscribers and/or modifying their service plans—to centralized provisioning may be frequent. Further, for any given deployment of a deployable, it may not be necessary for the local HSS to include up-to-date provisioning information for every member of a public safety organization. For example, only a subset of all possible emergency personnel may be deployed to a given site, so that only those deployed personnel need to be authenticated with and receive services from the deployable. But since the specific personnel deployed to a given site and/or at a given time may not be known ahead of time, the public safety organization must maintain up-to-date provisioning information in each of its conventional deployables.

In addition to the network authentication provisioning of the HSS, network subscribers may also have separate identification and authentication provisioning associated with some or all of one or more other services provided by application programs hosted in other parts of the service provider's network and/or in connected external networks. These services and remote applications may also be unreachable during the types of service interruptions, or in certain remote areas, that prevent and/or preclude communications between a RAN and the core network. In the context of public safety and emergency services, access to some or all of these other services and applications may also be important or even critical public safety operations. Thus, provisioning of these services and applications, including subscriber authentication support, must also be propagated to each conventional deployable. This adds to the already burdensome and inefficient subscriber provisioning procedures of conventional deployables. Therefore, there is need for a fast, efficient, and scalable approach to subscriber provisioning in deployables.

Accordingly, example system and methods disclosed herein provide for efficient and scalable provisioning of deployables of a public safety network. In particular, example embodiments enable user (subscriber) applications of a public safety network, including basic network service provisioning, to register with centralized registration facility, thereby aggregating all authentication provisioning information for one or more users in the registration facility. Next, on a per-user basis, the registration facility may generate a digital packet containing all the provisioning identification and authentication information for the user. The digital packet may then be encrypted and certified by the registration facility, and stored on a transportable physical medium and provided to the user. In accordance with example embodiments, each deployable may include, in addition to a local HSS, local versions of the applications and services. When a deployable is made ready for use in the field, a user may present and deliver the digital packet via the transportable physical medium to the deployable. The deployable may then certify the authenticity of the source of the packet, decrypt its contents, and provision the user both in the local HSS and in the local versions of the applications. In this way, provisioning is provided without needing to duplicate and maintain all centralized provisioning information with each deployable.

Hence, in one respect, various embodiments of the present invention provide a computing system disposed within a wireless communication system, the computing system comprising: an input/output (I/O) device; one or more processors; memory; and program instructions, stored in the memory, that upon execution by the one or more processors cause the computing system to perform operations including: receiving a first registration message transmitted from a first application program installed in and executing on one or more servers communicatively connected with the wireless communication system, wherein the first registration message includes a first user-schema that defines data for identifying and authenticating any given individual user with the first application program; receiving a first user-data message transmitted from the first application program, wherein the first user-data message includes (i) first-application ID data identifying a first user as a registered user of the first application program, and (ii) first-application authentication data for authenticating the first user with the first application program, the first-application ID data and first-application authentication data conforming to the first user-schema; receiving at the I/O device user-input data including a user secret of the first user; creating a first credentials data record containing at least the first-application ID data of the first user, the first-application authentication data of the first user, and an indication of the user secret of the first user; encrypting the first credentials data record with an encryption key of the computing system, and certifying the encrypted first credentials data record with a private key of the computing system; and transferring via the I/O device the certified, encrypted first credentials data record to a first tangible, transportable storage medium external to the computing system.

In another respect, various embodiments of the present invention provide a computing system disposed within a deployable wireless communication system, the computing system comprising: an input/output (I/O) device; one or more processors; memory; and program instructions, stored in the memory, that upon execution by the one or more processors cause the computing system to perform operations including: receiving a first registration message from a first application program installed in and executing on one or more processors of the deployable wireless communication system, wherein the first registration message includes a first user-schema that defines data for identifying and authenticating any given individual user with the first application program; receiving at the I/O device an encrypted first credentials data record transferred from a first tangible, transportable storage medium external to the deployable wireless communication system; certifying authenticity of the encrypted first credentials data record using a public key of an external server that created the encrypted first credentials packet, the public key having been stored in the computing system; decrypting the certified encrypted first credentials data record using an encryption key of the external server that created the encrypted first credentials data record, the encryption key having been stored in the computing system; extracting from the decrypted, certified encrypted first credentials data record: (i) first-application ID data identifying a first user as a registered user of the first application program, (ii) first-application authentication data for authenticating the first user with the first application program, and (iii) an indication of a user secret of the first user, wherein the first-application ID data and first-application authentication data conform to the first user-schema; receiving at the I/O device user-input data including the user secret of the first user; confirming a legitimate first correspondence between the user secret of the first user and the indication of the user secret of the first user; and in response to confirming the legitimate first correspondence, using the first-application ID data and the first-application authentication data to provision the first user in the deployable wireless communication system as a registered user of the first application program.

In still another respect, various embodiments of the present invention provide a method carried out by a computing system disposed within a wireless communication system, the method comprising: receiving a respective registration message transmitted from each respective application program of one or more application programs installed in and executing on one or more servers communicatively connected with the wireless communication system, wherein each respective registration message includes a respective user-schema that defines data for identifying and authenticating any given individual user with the respective application program that transmitted the respective registration message; receiving a respective first user-data message transmitted from each respective application program, wherein each respective first user-data message includes (i) respective application ID data identifying a first user as a registered user of the respective application program, and (ii) respective application authentication data for authenticating the first user with the respective application program, the respective application ID data and respective application authentication data conforming to the respective user-schema; receiving at an input/output (I/O) device of the computing system user-input data including a user secret of the first user; creating a first credentials data record containing at least the respective application ID data of the first user for each respective application program, the respective application authentication data of the first user for each respective application program, and an indication of the user secret of the first user; encrypting the first credentials data record with an encryption key of the computing system, and certifying the encrypted first credentials data record with a private key of the computing system; and transferring via the I/O device the certified, encrypted first credentials data record to a first tangible, transportable storage medium external to the computing system.

In yet another respect, various embodiments of the present invention provide a method carried out by a deployable wireless communication system, the method comprising: receiving a respective registration message from each respective application program of one or more application programs installed in and executing on one or more processors of the deployable wireless communication system, wherein each respective registration message includes a respective user-schema that defines data for identifying and authenticating any given individual user with the respective application program that sent the respective registration message; receiving at an input/output (I/O) device of the deployable wireless communication system an encrypted first credentials data record transferred from a first tangible, transportable storage medium external to the deployable wireless communication system; certifying authenticity of the encrypted first credentials data record using a public key of an external server that created the encrypted first credentials packet, the public key having been stored in the deployable wireless communication system; decrypting the certified encrypted first credentials data record using an encryption key of the external server that created the encrypted first credentials data record, the encryption key having been stored in the deployable wireless communication system; for each respective application program, extracting from the decrypted, certified encrypted first credentials data record: (i) respective application ID data identifying a first user as a registered user of the respective application program, and (ii) respective application authentication data for authenticating the first user with the respective application program, wherein the respective application ID data and the respective application authentication data conform to the respective user-schema; extracting from the decrypted, certified encrypted first credentials data record an indication of a user secret of the first user; receiving at the I/O device user-input data including the user secret of the first user; confirming a legitimate first correspondence between the user secret of the first user and the indication of the user secret of the first user; and in response to confirming the legitimate first correspondence, for each respective application program, using the respective application ID data and the respective application authentication data to provision the first user in the deployable wireless communication system as a registered user of the respective application program.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 2 depicts an example of an application program architecture, in accordance with example embodiments.

FIG. 3C illustrates an example enhanced deployable network, in accordance with example embodiments.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Wireless Network

The systems and methods described herein are set forth only as examples. As such, those skilled in the art will appreciate that other arrangements and element (e.g., machines, interfaces, functions, orders, and groupings of functions) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For example, one or more processors executing instructions stored in memory may implement one or more of the features and functions described herein.

Figure 1A:
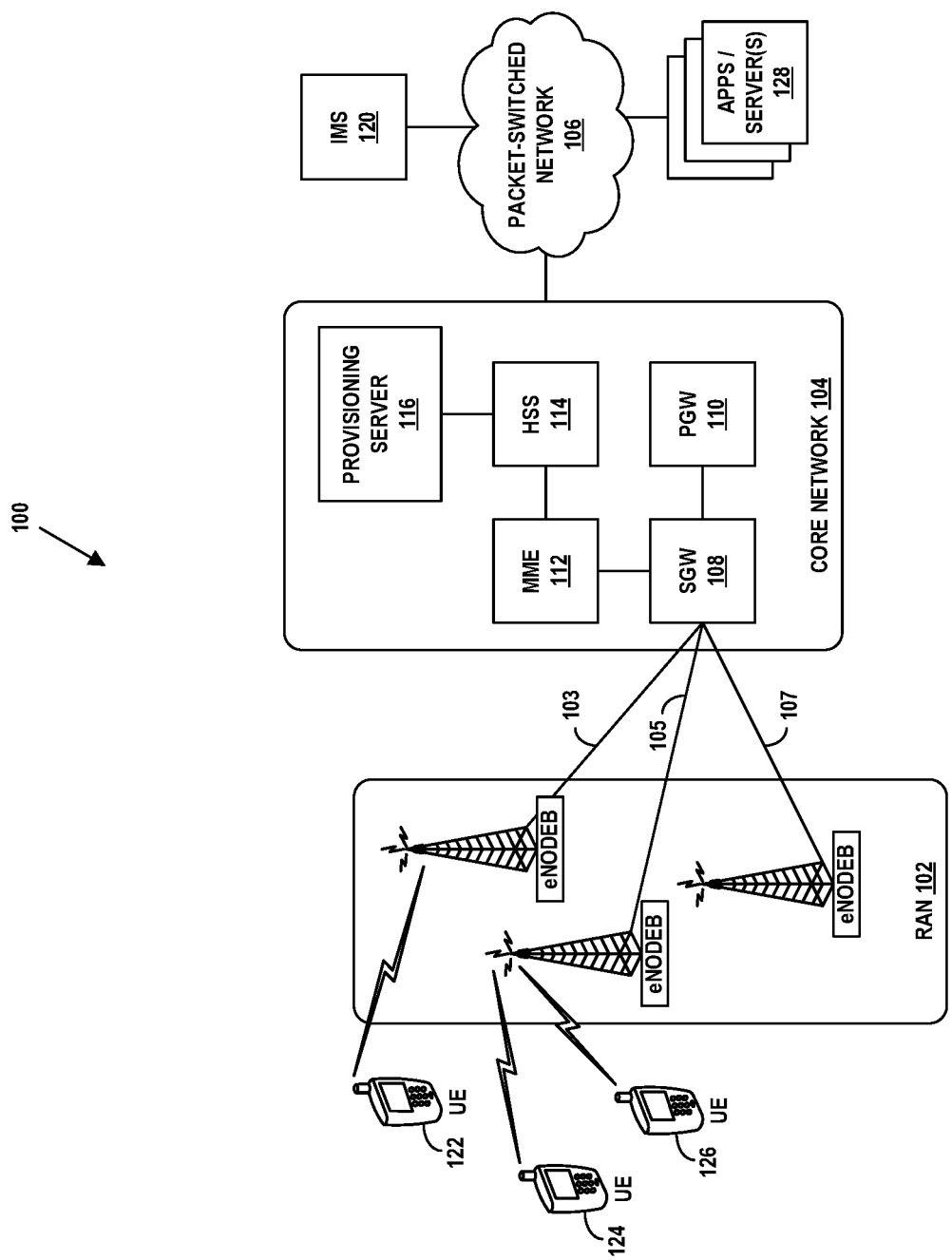
FIG. 1A illustrates a simplified network, in accordance with example embodiments.

Referring to the drawings, FIG. 1A is a simplified block diagram of a wireless communication system or network 100 in which example embodiments disclosed herein can be implemented. By way of example, the network 100 is taken to be an LTE network. It should be understood, however, that example embodiments could be implemented in other types of network, as well.

In the illustrated example, the wireless network 100 in FIG. 1A is taken to include a representative LTE radio access network (RAN) 102 including three example LTE base stations (also referred to as eNodeB in LTE), each of which radiates to provide a wireless coverage area defining a respective LTE air interface which the base station may serve one or more UEs. By way of example, a UE 122 is being served by one of the eNodeBs, UEs 124 and 126 are being served by a second of the eNodeBs, and there are no UEs shown to be associated with the third eNodeB. The RAN 102 may include more or fewer base stations, and can also be taken to represent base stations at various locations.

Each of the base stations is then shown coupled with core LTE network 104 by way of one of three backhaul connections 103, 105, or 107. The core network 104 may include a a serving gateway (SGW) 108 and a mobility management entity (MME) 112 that terminates one or more backhaul connection, and a packet-data network gateway (PGW) 110 that provides connectivity with a packet-switched network 106, such as the Internet. Further, the MME is configured to communicate with a Home Subscriber Server (HSS) 114, which may store account and service profiles and security/authentication information for various UEs. In practice, the LTE access network may be operated by a cellular wireless service provider, and the UE may subscribe to service of that provider.

The core network 104 is further shown as include a provisioning server 116, which facilitates set-up, management, and maintenance of subscribers in the network. Thus, through the provisioning server 116, a service provider may add and delete subscribers, including entering data into user profiles that specify on a per user basis permissions, privileges, services, security and authentication information, all of which may establish and control user or subscriber access to the network. An active or valid subscriber may also be able to enter certain types of information in the profile or HSS, such as passwords or other types of user security secrets.

By way of example, the packet-switched network is shown to include servers 128 that host one or more application programs ("apps"). These could be services or applications provided by the service provider and/or by third parties accessible via the packet network 106. The packet network 106 is also show as including an Internet Protocol (IP) Multimedia System (IMS), which, as is known, operates according to various industry and academic standards to provide packet-based multimedia services, such as 3GPP 23.228, 3GPP 22.238, RFC 7651, among others. Non-limiting examples of services and applications include audio and/or video streaming and other forms of media content delivery, multi-media-based communication services (e.g., video calls and conferences), as well as interactive programs and applications for controlling and managing media transmission, reception, delivery, and presentation on client devices, such as UEs.

With the example arrangement shown, when a UE enters into coverage of network, the UE may transmit an attach request over the air interface to the base station. This attach request may then cause the network to establish for the UE one or more default bearers.

Taking the UE 124 as an example, when middle eNodeB in the RAN 102 receives an initial attach request from the UE 124, the eNodeB may forward the attach request to the over the backhaul 105 to the MME 112. The MME may then authenticate and authorize the UE and obtain from HSS 114 an indication of one or more application services to which the UE subscribes and may store an indication of those services in a context record for the UE, keyed to a UE identifier such as an International Mobile Subscriber Identity (IMSI) for instance. For each of various services, the MME may then allocate for the UE a respective bearer ID (e.g., evolved packet system (EPS) bearer ID), which the MME may store in the UE context record in correlation with an identity of the base station for instance. Further, for each such service, the MME then engage in signaling with the SGW 108 and the eNodeB to set up a respective bearer, defining a logical tunnel over which bearer data can flow to and from the UE.

Figure 1B:
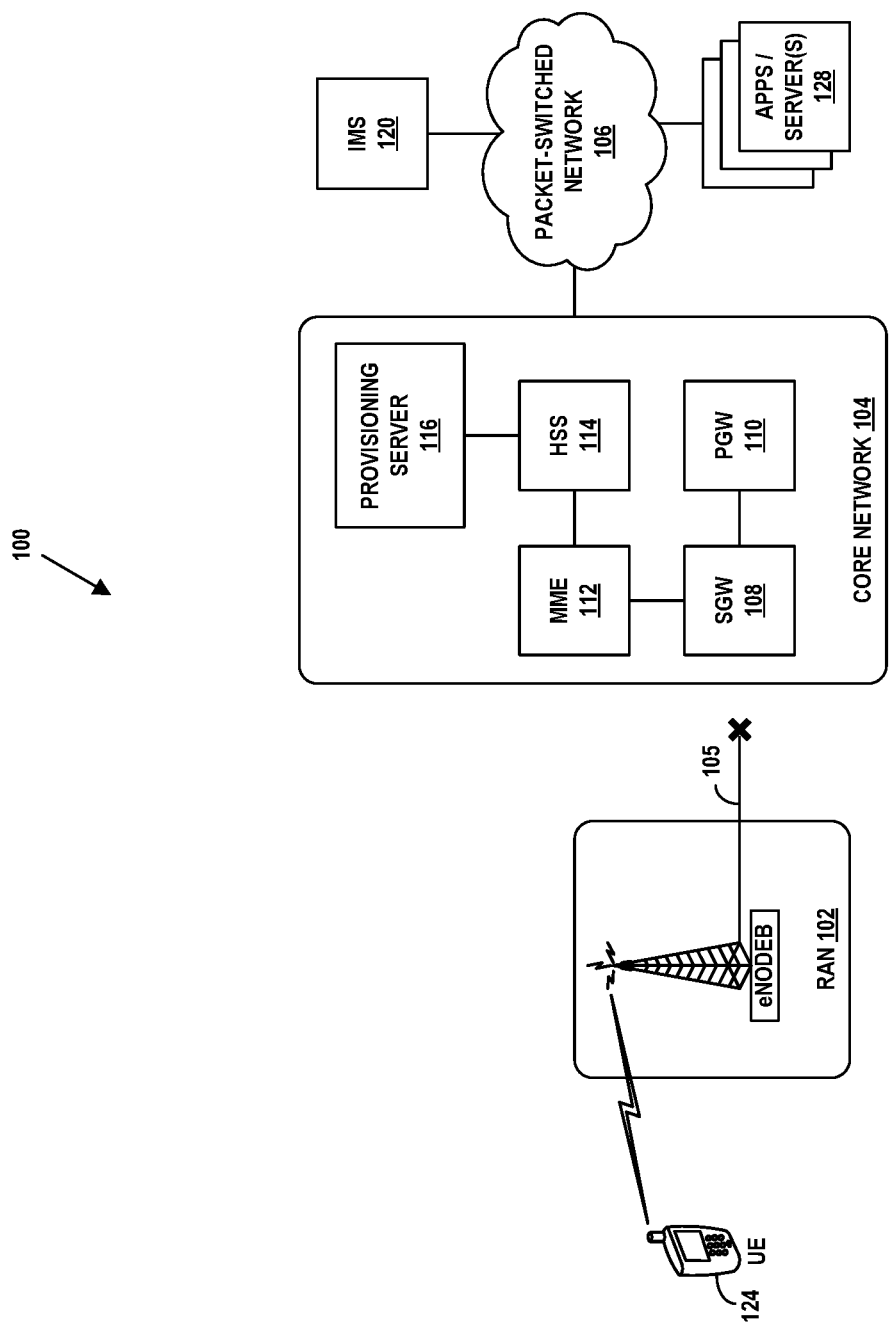
FIG. 1B illustrates an example of service interruption in a simplified depiction of a wireless network, in accordance with example embodiments.

Cellular wireless networks, such as LTE network 100 described above, may also be used for public safety networks, either as standalone networks or overlaid on existing networks of service providers. As such, the operations and procedures described above for a UE to gain wireless access and receive service from the network apply as well to emergency and public safety personnel. In particular, a public safety network will typically have its own HSS for its personnel and their associated UEs. A public safety network must also be able to operate under circumstances in which a RAN or part of a RAN loses connectivity with the core network, such as in the event of a natural disaster. FIG. 1B schematically illustrates such a situation in which the RAN (and eNodeB) serving the UE 124 loses its backhaul 105 connection to the core network 104 (other eNodeBs and UEs shown in FIG. 1A have been omitted for the sake of brevity in FIG. 1B). As a result, the UE 124 cannot even be authenticated to attach to the network.

Figure 1C:
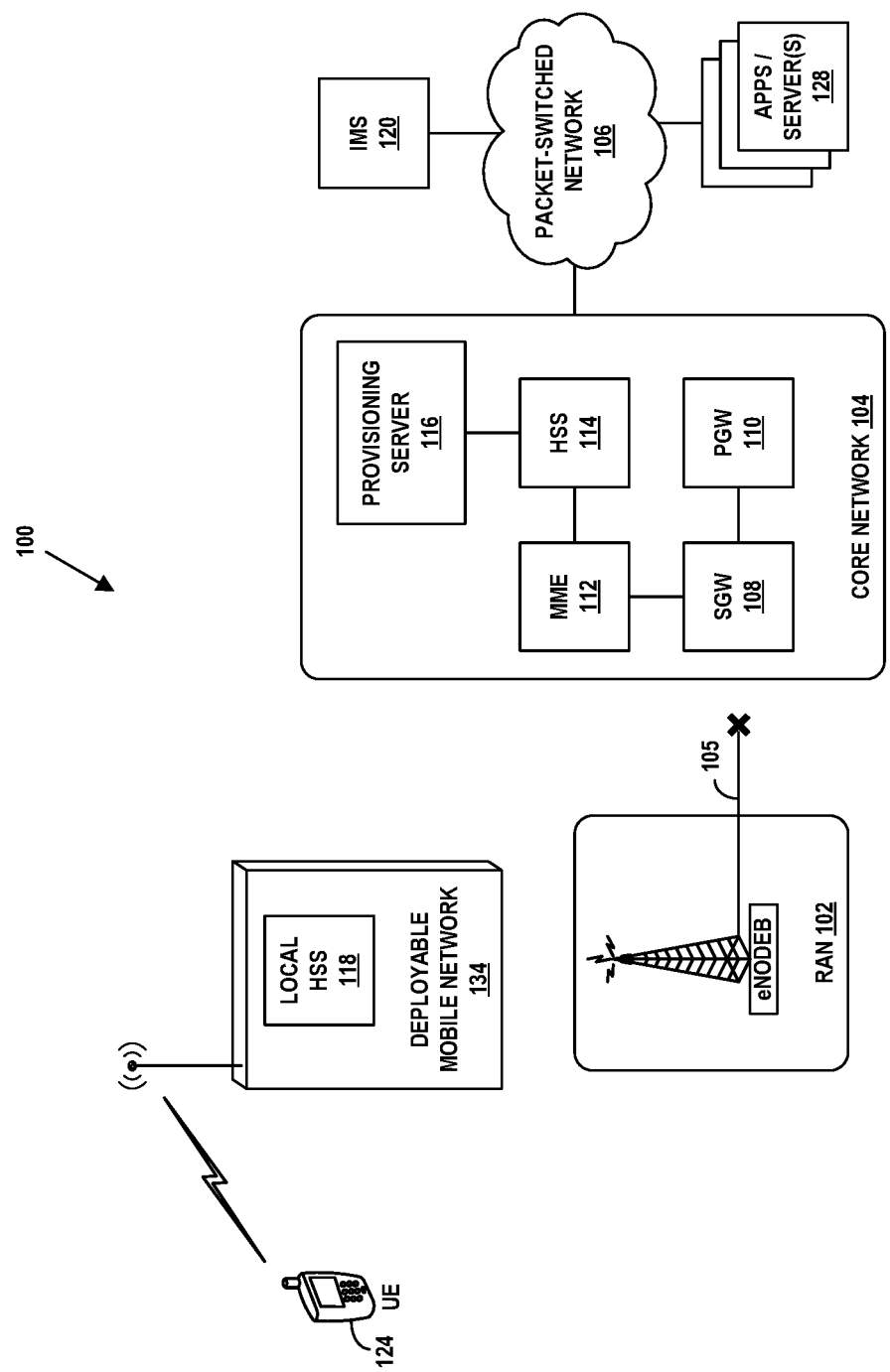
FIG. 1C illustrates an example of a deployable network, in accordance with example embodiments.

In order to address such emergency situations, a public safety network may employ form of portable network customarily referred to as a "deployable." FIG. 1C illustrates deployment of a deployable mobile network 134 under the service interruption circumstances shown in FIG. 1B. The deployable 134 integrates the functionality of a RAN and many aspects of the core network, including a local HSS 118 that duplicates the centralized HSS 114, in a portable standalone unit or portable standalone system (e.g., locallyconnected components within a portable enclosure). When deployed in a geographic region where normal service has been interrupted, a deployable makes it possible for emergency personnel to authenticate their UEs with the cellular wireless network of the deployable (and vice versa), and thereby be afforded wireless communications within an area served by the deployable. A public safety organization may have multiple deployables that may be deployed to provide multiple independent portable wireless networks in different geographic regions, or which may be deployed across an extended region and communicate with each other to provide a larger portable network over the extended region.

By including or integrating a local HSS 118, the UE 124 can authenticate with and attached to the cellular network provided by the deployable 134. That is, the procedures and protocols for servicing the UE 124 in the normal network, such as shown in FIG. 1A, can be used with the deployable 134 as well. In a conventional deployable, the local is a duplicate, or nearly so, of the core HSS 114. Setting up and maintaining the local HSS can therefore be cumbersome and inefficient. For example, each time there is a change to the core HSS, such as by way of a provisioning server, the local HSS of each deployable needs to be updated. In addition, in any given deployment scenario, it may not be necessary to have all the personnel of a public safety organization provisioned in the local HSS. Further, public safety personnel may also use the IMS 120 and/or applications and services of the servers 128. Not only will these applications and services be unavailable in a conventional deployable, each may require its own user/subscriber registration and/or authentication. Thus, the inefficiency of updating the HSS for basic network access applies for each application and service of each user/subscriber.

In accordance with example embodiments, a method and system are provided for self-provisioning and self-identification in which each user's provisioning data, authentication information, and credentials can be securely packetized and transferred to a secure, transportable, tangible storage medium that, when presented to an appropriately enabled deployable, causes a transfer of the identification and credentials from the storage medium to the deployable, resulting in an automatic provisioning of the user. The approach of the example embodiments is referred to herein as "Resilience Of Security, Identity, and Applications" or "ROSIA." Under ROSIA, application programs are described in terms of a high-level that distinguishes between components in a way that separates out user-specific data related to per-user provisioning from other data and software components that may be installed in an "enhanced deployable." The installed components may typically be updated only occasionally, while the user-specific data may be encapsulated in the credentials and presented to an enhanced deployable where they may then be imported by a local ROSIA entity, referred to herein as a ROSIA "registrar," for user provisioning. Details of ROSIA are discussed below.

II. Example Operation of Self-Provisioning Using Rosia

In accordance with example embodiments, ROSIA supports transport of identifications and credentials for UE and subscriber authentication with the cellular wireless network of the deployable, as well user provisioning data and authentication specific to applications. The most basic application is the mobile network itself. This includes authentication, registration, access, and basic communication services. Other applications may be built on top of the basic network application. Non-limiting examples include Voice over LTE, IMS, Push-to-Talk, and location tracking. ROSIA provides a registration application programming interface (API) with which applications may register with ROSIA in the core network, and with ROSIA in the local network of a deployable. This ensures consistency of information of users and applications in the core network and the deployable network.

In accordance with example embodiments, an enhanced deployable may include local versions of applications, such the IMS and other services.

FIG. 2 depicts an example high-level abstraction of an application 202. As shown, the application includes application software 204, application data 206, an application user template 208, and an application user schema 210. The application software 204 includes code and instructions for the application. The application data 206 includes application-specific data structures, definitions, and the like that support execution and operation of the application. The application user template includes user data that may be common to certain types or groups of users. For example, it could specify data values, settings, and assignments that are common to personnel of a city fire department. The application user schema 210 then defines schematics of data values, settings, and assignments that are specific to individual users. Note that the application user template 208 and the application user schema 210 are made up of two components. One—the schema—defines the data types, definitions, structures, and formats, while the other—a template—specifies the values and settings of the data themselves.

More particularly, the application user schema 210 may be considered as user data schematics for user data that are generally different for different users. By way of example, the application user schema could define the schematics of (i) a subscriber identity according to IMSI or other identifier of the subscribers UE (or other mobile device), and (ii) an authentication/security key. In an example embodiment, the application user schema 210 could further be defined in using various coding/definition languages, such as XML Schema Definition (XSD). Other languages could be used as well.

The application user template 208 and application user schema 210 can be understood by way of example by considering two possible example applications of the LTE network 100. One example application is the basic LTE application, which provides basic access and cellular wireless communications for users/subscribers of the network. The other example application is taken to be the IMS application, which provides multi-media services that ride on top of the LTE network.

In the LTE application of this example, each subscriber has a unique IMSI and Ki security key. Subscribers from the same public safety department may have the same roaming policy. The LTE application can be abstracted using a user template and user schema as follows.

An LTE Network Application User Template is illustrated by way of example in Table 1.

TABLE 1

LTE Network Application User Template Example

| Attribute | Value |
|---|---|
| a. Name | FireDepartment |
| b. National Roaming | Allowed |
| c. International Roaming | Denied |

TABLE 1-continued

LTE Network Application User Template Example

| Attribute | Value |
|---|---|

An LTE Network Application User Schema is illustrated by way of example in Table 2.

TABLE 2

LTE Network Application User Schema Example

| Attribute | Type | Length |
|---|---|---|
| a. IMSI | Digital | Min, Max = 15 |
| b. Ki | Hex | Min, Max = 32 (128 bits) |
| c. Roaming template name | Char | Max = 20 |

In the example IMS example application, the user has one private identity and two public identities. One public identity is for working ours, and the other is for outside working hours and emergencies. The IMS user template defines a common part of certain user group's user data. The template is internal to the IMS application. It is address externally by its name.

An IMS Application User Template is illustrated by way of example in Table 3.

TABLE 3

IMS Application User Template Example

| Attribute | Value |
|---|---|
| a. Template Name | FireDepartment |
| b. FirstPublicIdentityPolicy | Any calls, any messages, any video from any person |
| c. SecondPublicIdentityPolicy | Emergency calls from dispatchers |

An IMS Application User Schema is illustrated by way of example in Table 4.

TABLE 4

IMS User Schema Example

| Attribute | Type | Length |
|---|---|---|
| a. User Private Identity | URL | Max = 50 chars |
| b. User Security Key | Char | Max = 20 chars |
| c. First Public Identity | URL | Max = 50 chars |
| d. Second Public Identity | URL | Max = 50 chars |
| e. Template name | Char | Max = 20 chars |

In accordance with example embodiments, ROSIA may be implemented in an enhanced provisioning server in the core network and a local ROSIA registrar in an enhanced deployable mobile network. In addition, the enhanced deployable may also include local versions of the IMS and other network applications, in addition to a local version of the HSS. Note that all local versions may not initially include any of the user-specific data defined according to the application user schema. This aspect of provisioning is acquired in the local versions by way of the self-provisioning process, as described below.

Figure 3A:
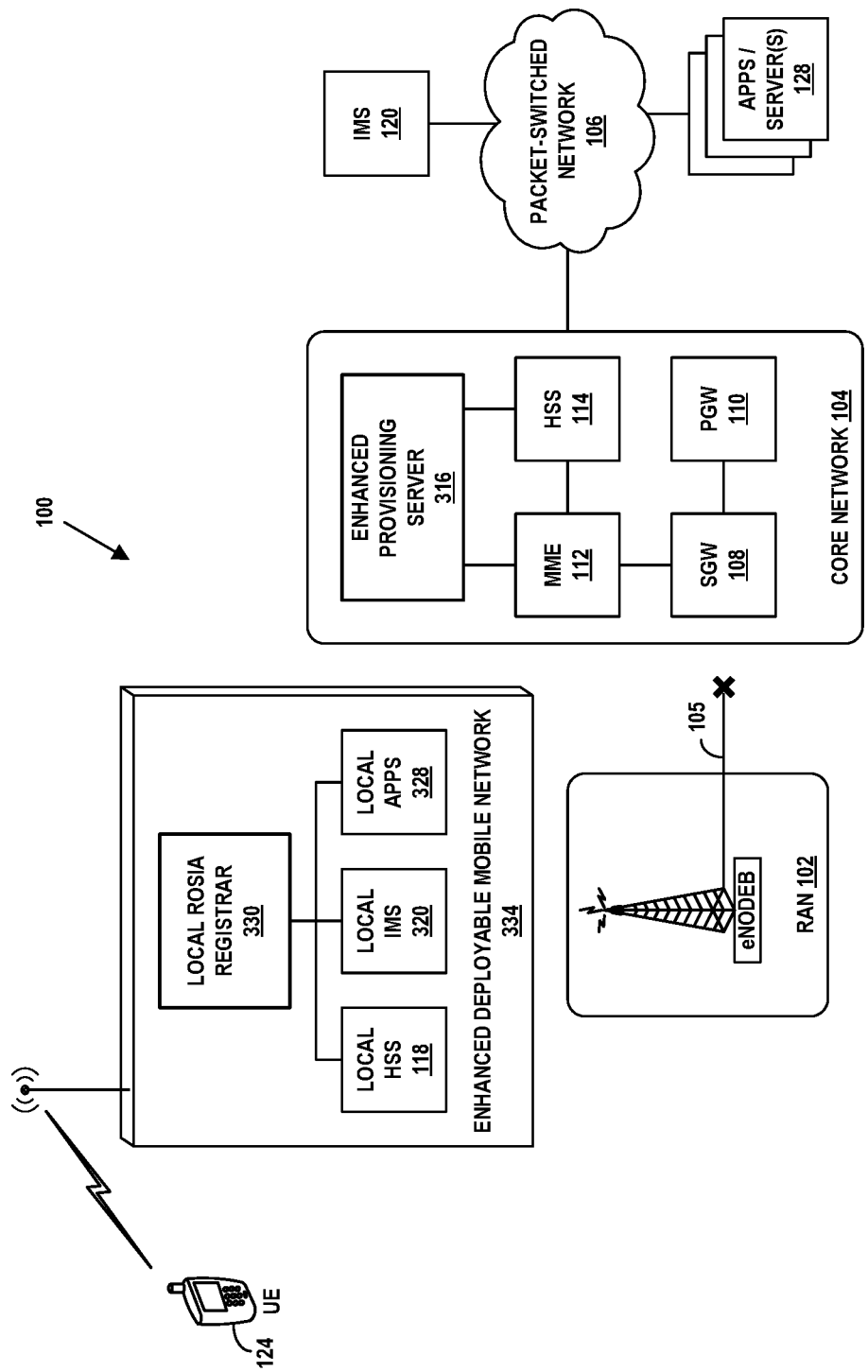
FIG. 3A illustrates example deployment of an example enhanced deployable network, in accordance with example embodiments.
Figure 3B:
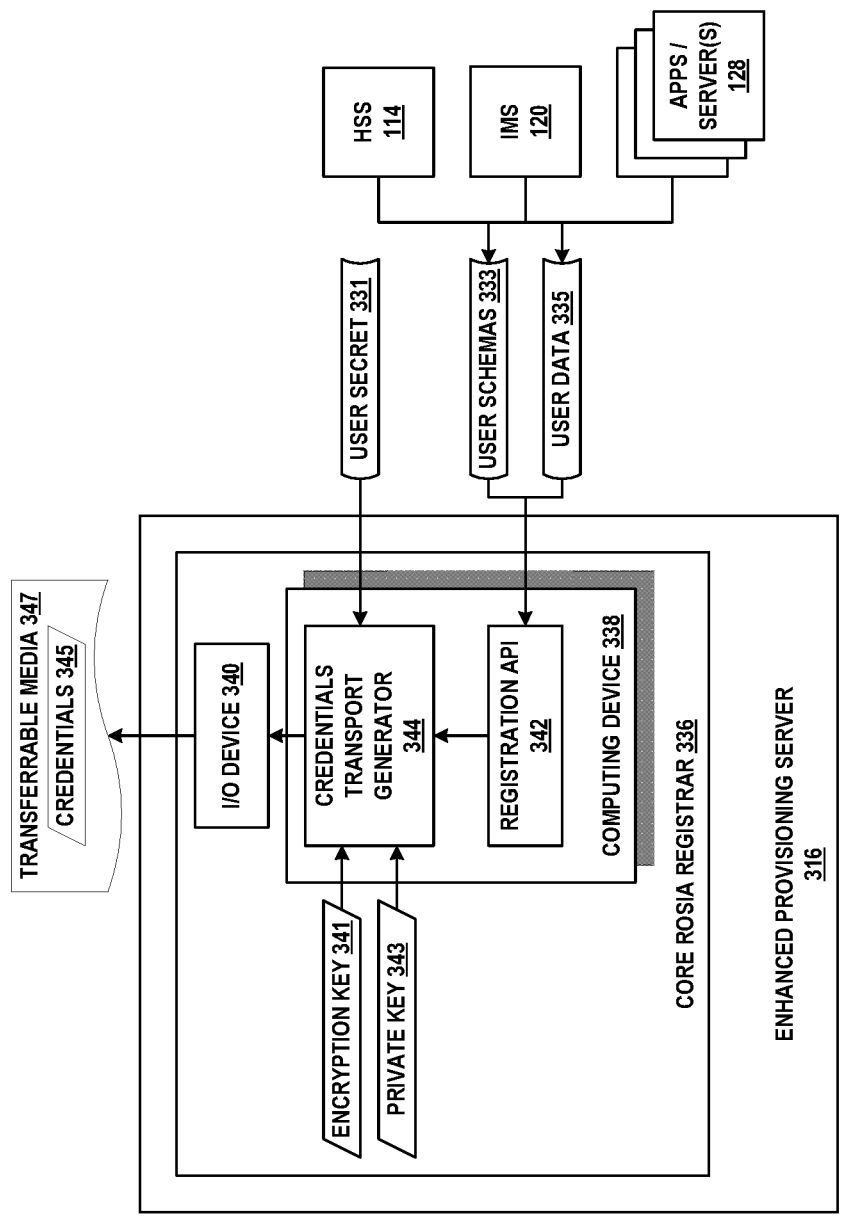
FIG. 3B illustrates an example enhanced provisioning server, in accordance with example embodiments.

FIG. 3A shows the LTE network 100, now with an enhanced provision server 316 in its core 104 and an enhanced deployable mobile network 334 deployed in the field where the RAN 102 and its eNodeB have evidently and by way of example lost backhaul 105 connectivity with the core network 104. As shown, the enhanced deployable 334 includes a local HSS 118, local IMS 320, local APPs 328, and a local ROSIA registrar 330. FIGS. 3B and 3C illustrate the enhanced provision server 316 and the enhanced deployable mobile network 334. Consideration of each figure also illustrates an operational example of ROSIA self-provisioning.

While the example of FIG. 3A (and as further detailed in FIGS. 3B and 3C) illustrates operation of the enhanced deployable mobile network 334 in a circumstance in which an absence of connectivity with the core network 104 is due to a failed or disrupted backhaul connection, it should be understood that the enhanced deployable mobile network 334 (or similar) could also be deployed in an environment that lacks any such connectivity to begin with. For example, the enhanced deployable mobile network 334 could be deployed in a remote location, such as national park or forest, or wilderness area in which there is no cellular wireless coverage. That is, emergency coverage is not limited only to areas affected by network failures, but may include out-of-coverage areas as well (or alternatively).

As shown in FIG. 3B the enhanced provisioning server 316 includes a core ROSIA registrar 336, which includes a computing device 338. An example of such computing device is described later. The core ROSIA registrar 336 also includes an I/O device 340, as well as an encryption key 341 and a private key 343. Note I/O device 340 could be the same or different as an I/O device described below as part of the computing device 338. The encryption key 341 and private key 343 could be stored in memory of the core ROSIA registrar 336, for example. Also as shown, a registration API 342 and a credentials transport generator 344 both execute on the computing device in the present example.

In accordance with example embodiments, when the core network starts up, the applications of the network register with the core ROSIA registrar 336. These may include the basic network (LTE) application, as provisioned in the HSS 114, the IMS application 120, and the APPs 128. Each respective application maintains user data for individual users, defined according to the application user schema for the respective application. In registering, each application sends or transmits is application user schemas 333, which define the user data type, formats, etc. These are received via the registration API 342, and make the applications known to the core ROSIA registrar 336.

Generation and creation of secure transportable credentials may be carried out by a network operator or administer by user request. User data 335 for a given user is obtained either from ROSIA's own storage or from each application, and passed to the credentials transport generator 344. A user secret 331 must also be supplied to the credentials transport generator 344 in order to verify and authenticate the user during the importing process. Non-limiting examples of a user secret include a password or other character-based secret, as well as biometric data, such as a fingerprint or retinal scan, or other unique biometric identifier (e.g., facial recognition). The credentials transport generator then packages the user data for the user into a data record, encrypts the record using the encryption key 341, and certifies the authenticity of the record by signing in the private key 343. The encrypted, certified credentials record 345 is then written to or store on a transferrable medium 347. Non-limiting examples of the transportable medium include a sticker with a QR code, a flash drive, a USB device, RFID device, and memory of a mobile device (e.g. a UE). The transferrable medium 347 is then ready for use in self-provisioning with an enhanced deployable.

The generation process is carried out on a per-user basis, and for each user, the user data for each application with which the user is registered and authenticated is included in the credentials record 345. In the example above, each user's credentials packet would include security authentication and identification for the LTE application and the IMS application.

FIG. 3C depicts an example enhanced deployable 334, and illustrates operation of self-provisioning and user provisioning. As shown, the enhanced deployable includes the local HSS 118, local IMS 320, local APPs 328, and a local ROSIA registrar 330. The local ROSIA registrar 330 includes a computing device 358. Again, an example of such computing device is described later. The local ROSIA registrar 330 also includes an I/O device 340, as well as an encryption key 351 and a public key 353. Note I/O device 340 could be the same or different as an I/O device described below as part of the computing device 358. The encryption key 351 and public key 353 could be stored in memory of the core ROSIA registrar 330, for example. Also as shown, a registration API 352 and a credentials importer 354 both execute on the computing device in the present example.

When the deployable powers one, the local HSS 118, local IMS 320, local APPs 328 all register with the registration API 358. This includes providing the user schemas 333, which define the user data, but does not supply and actual user data. The local ROSIA registrar 330 learns of the application in this process.

Self-provisioning may be initiated when a user presents her/his transferrable media 347 to the I/O device 340. Non-limiting examples of how this may be done include placing a QR sticker in QR scanner, swiping an RFID device by an RFID reader, plugging in a USB device, or aiming an IR transmitter on a UE towards an IR receiver on the enhanced deployable 334. The user also enters his/her user secret 331 to the credential importer 354. This ensures that the self-authentication request is legitimate. The credentials importer receives the credentials by way of the I/O device 340, certifies the authenticity using the public key 335 of the core ROSIA registrar 336. The certified credentials are then decrypted using the encryption key 353, and the user data 335 extracted. The user data 335 may then be provisioned into the appropriated application on one or another of the local HSS 118, local IMS 320, or local APPs 328. The user is then authenticated and provisioned in the deployable 334.

The self-provisioning process can be carried out on a per-user basis, and for each user, the user data for each application with which the user is registered and authenticated in the core network provisioned in the enhanced deployable. In the example above, each user's credentials packet would include security authentication and identification for the LTE application and the IMS application, and thus each user that self-authenticates with the enhanced deployable would be provisioned for LTE and IMS in the enhanced deployable.

III. Example Computing Device

Figure 4:
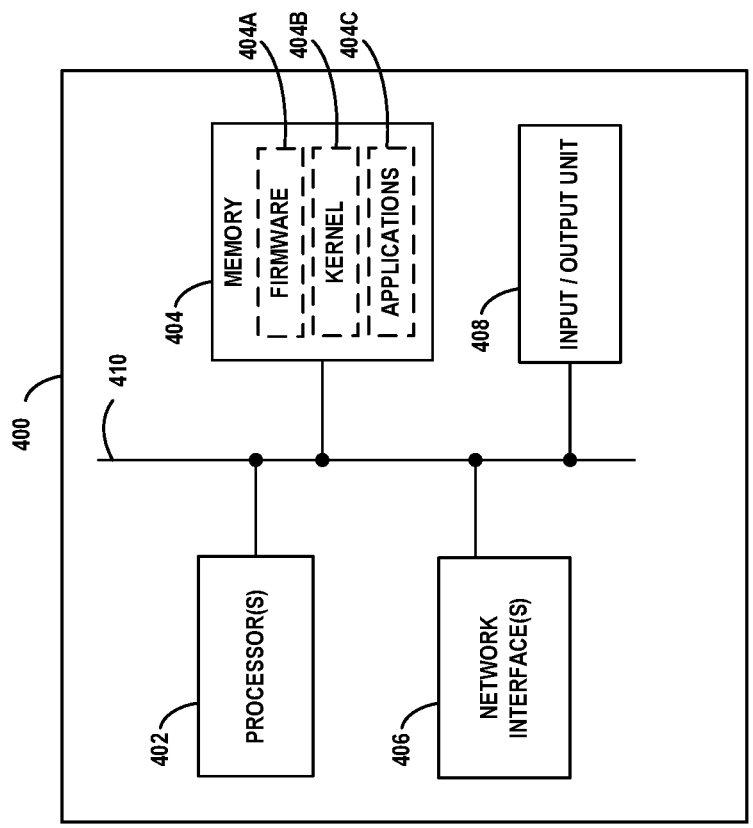
FIG. 4 illustrates a schematic drawing of an example computing device, in accordance with example embodiments.

FIG. 4 is a simplified block diagram exemplifying a computing device 400, illustrating some of the components that could be included in a computing device arranged to operate in accordance with the embodiments herein. The computing device 400 serves as an example of the computing devices illustrated in the enhanced provisioning server 316 of FIG. 3B and/or the enhanced deployable mobile network 334 of FIG. 3C. The computing device 400 may also describe a computing device or component of a computing system that could be part of other network entities illustrated in FIGS. 1A-1C and or 3A-3C. Computing device 400 could be a client device (e.g., a device actively operated by a user), a server device (e.g., a device that provides computational services to client devices), or some other type of computational platform. Some server devices may operate as client devices from time to time in order to perform particular operations In this example, computing device 400 includes processor (s) 402 (referred to as "processor 402" for sake of simplicity), memory 404, network interface(s) 406, and an input/output unit 408, all of which may be coupled by a system bus 410 or a similar mechanism. In some embodiments, computing device 400 may include other components and/or peripheral devices (e.g., detachable storage, printers, and so on).

Processor 402 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 402 may be a single-core processor, and in other cases, processor 402 may be a multi-core processor with multiple independent processing units. Processor 402 may also include register memory for temporarily storing instructions being executed and related data, as well as cache memory for temporarily storing recently-used instructions and data.

Memory 404 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 404 may store program instructions and/or data on which program instructions may operate. By way of example, memory 404 may store these program instructions on a non-transitory, computer-readable medium, such that the instructions are executable by processor 402 to carry out any of the methods, processes, or operations disclosed in this specification or the accompanying drawings.

As shown in FIG. 4, memory 404 may include firmware 404A, kernel 404B, and/or applications 404C. Firmware 404A may be program code used to boot or otherwise initiate some or all of computing device 400. Kernel 404B may be an operating system, including modules for memory management, scheduling and management of processes, input/output, and communication. Kernel 404B may also include device drivers that allow the operating system to communicate with the hardware modules (e.g., memory units, networking interfaces, ports, and busses), of computing device 400. Applications 404C may be one or more user-space software programs, such as web browsers or email clients, as well as any software libraries used by these programs.

Network interface(s) 406 may take the form of a wireline interface, such as Ethernet (e.g., Fast Ethernet, Gigabit Ethernet, and so on). Network interface(s) 406 may also support communication over non-Ethernet media, such as coaxial cables or power lines, or over wide-area media, such as Synchronous Optical Networking (SONET) or digital subscriber line (DSL) technologies. Network interface(s)

406 may also take the form of a wireless interface, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 406. Furthermore, network interface(s) 406 may comprise multiple physical interfaces. For instance, some embodiments of computing device 400 may include Ethernet, BLUETOOTH®, and Wifi interfaces.

Input/output unit 408 may facilitate user and peripheral device interaction with example computing device 400. Input/output unit 408 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 400 may communicate with other devices using a universal serial bus (USB) or high-definition multimedia interface (HDMI) port interface, for example.

IV. Example Methods

Figure 5:
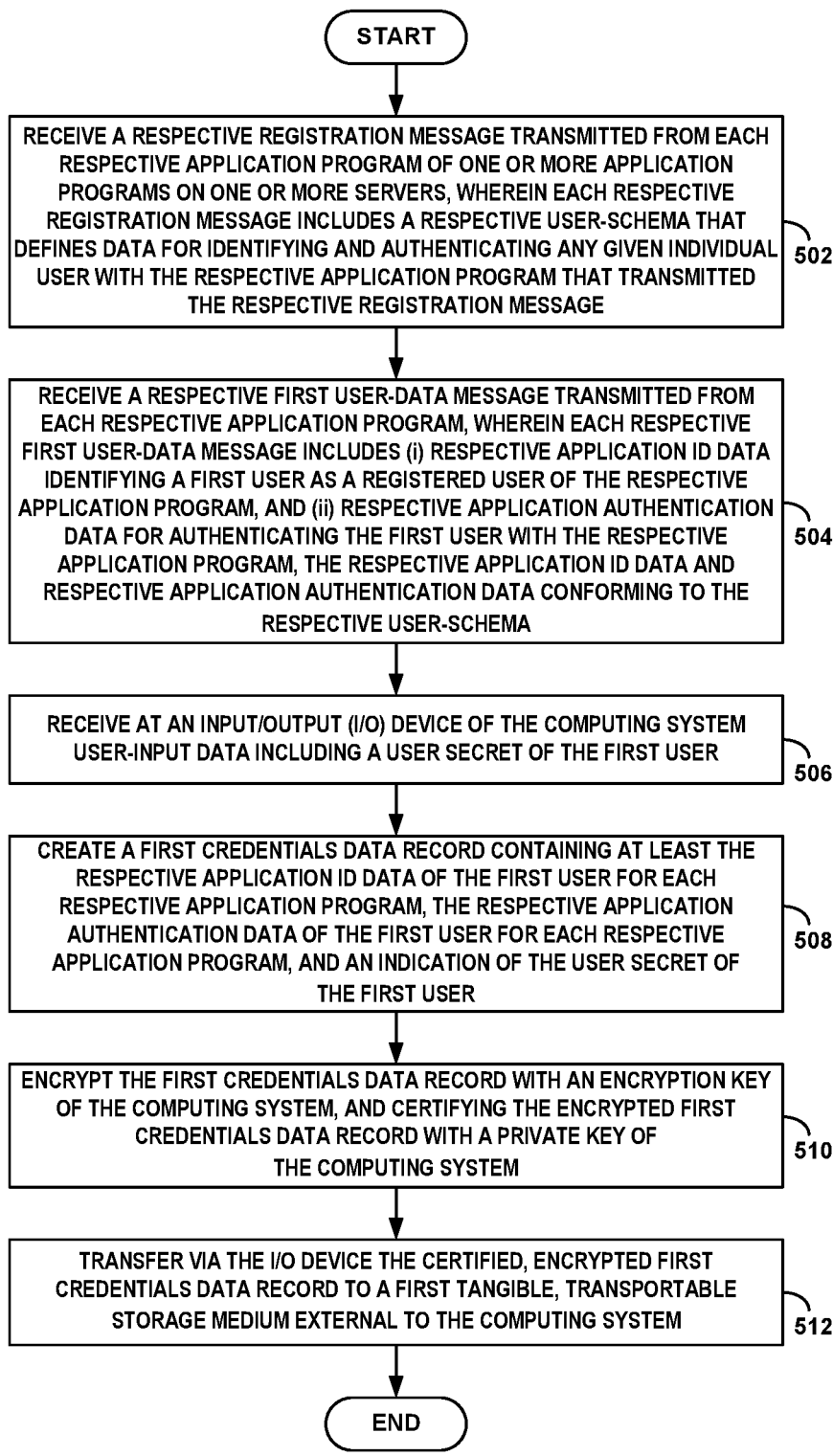
FIG. 5 is a flow chart of a first example method, in accordance with example embodiments.
Figure 6:
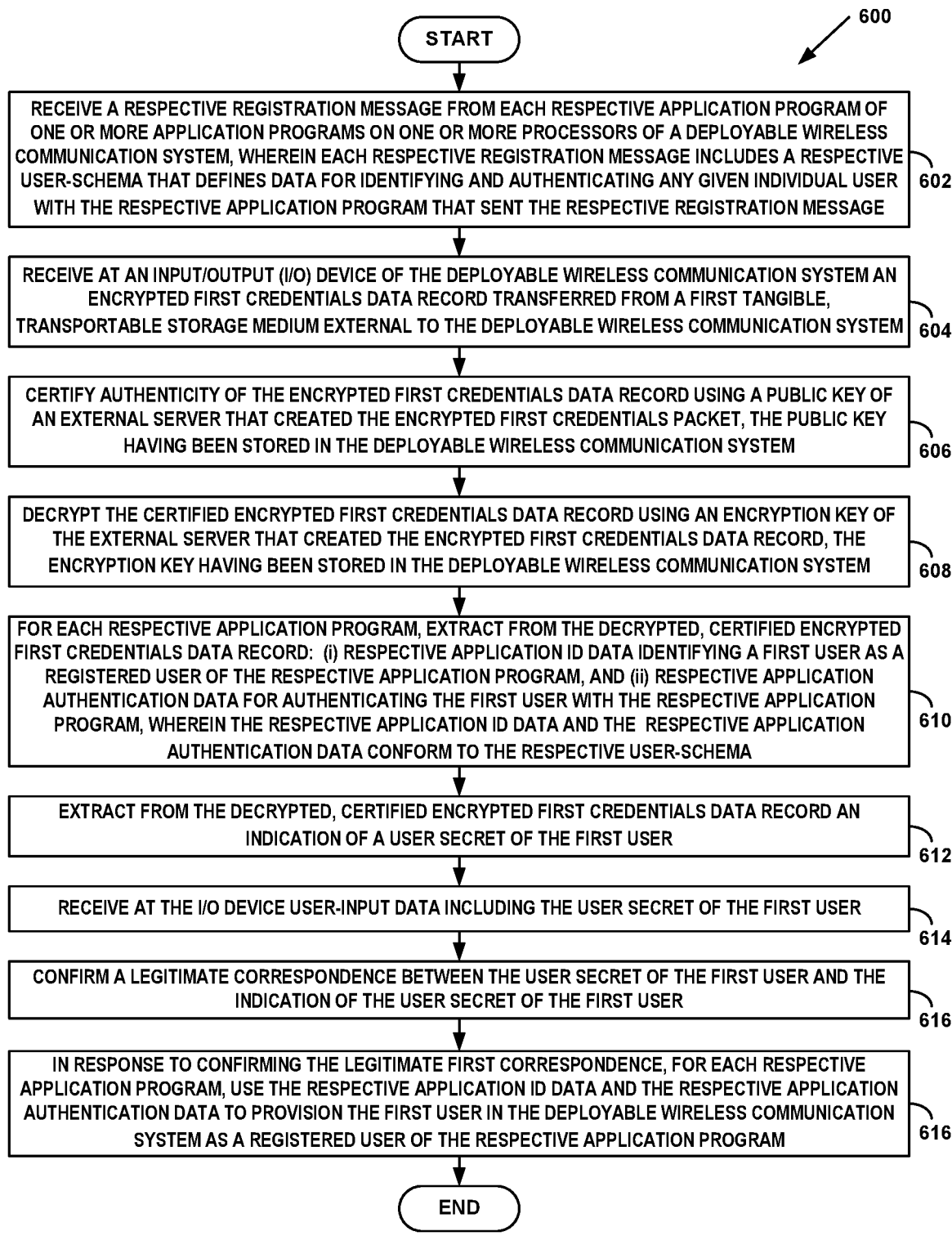
FIG. 6 is a flow chart of a second example method, in accordance with example embodiments.

FIGS. 5 and 6 are flow charts of example methods 500 and 600 of self-authentication of mobile devices within deployable mobile networks, in accordance with example embodiments. The method 500 illustrates generation of authentication credentials and creation of a credentials data record, including transferring the credentials data record to a tangible, transportable storage medium. The method 600 illustrates use of a credentials data record retrieved from a tangible, transportable storage medium by a deployable mobile network to authenticate, provision, and register a subscriber with the deployable mobile network.

The method illustrated by FIG. 5 may be carried out by a computing system disposed within a wireless communications system, while the method illustrated by FIG. 6 may be carried out by a computing system disposed within a deployable wireless communications system. The example methods 500 and 600 may be implemented as machine language or other forms of computer-readable programmatic instructions stored in memory and accessible to one or more processors of the computing device or computing system that, when executed by one or more processors of the computing device or computing system, cause the computing device or computing system to carry out the various steps, functions, and/or operations described herein. The machine language or other forms of programmatic instructions may further be stored on tangible, non-transitory computer-readable medium for delivery to and loading in one or more computing systems for subsequent execution. Non-limiting examples of a computing device include a computing device 400 described above and illustrated in FIG. 4. However, the method can be carried out by other types of devices or device subsystems.

The embodiments of FIGS. 5 and/or 6 may be simplified by the removal of any one or more of the features shown therein. Further, these embodiments may be combined with features, aspects, and/or implementations of any of the previous figures or otherwise described herein. Method 500 shown in FIG. 5 is described first.

At block 502, the computing system receives a respective registration message transmitted from each respective application program of one or more application programs. The application programs may be installed in and executing on one or more servers communicatively connected with the wireless communication system. Each respective registration message may include or contain a respective user-schema that defines data for identifying and authenticating any given individual user with the respective application program that transmitted the respective registration message. In an example embodiment, communication between the applications and the computing system may be facilitated by an application programming interface (API), so that the computing system may receive respective registration messages as API calls from the respective applications. As such, API call procedures could be supported by underlying message transmissions between servers and the computing system. Other arrangements are possible as well.

At block 504, the computing system receives a respective first user-data message transmitted from each respective application program, or possibly retrieved from memory. Each respective first user-data message is associated with a particular user—a "first" user—and each includes (i) respective application ID data identifying the first user as a registered user of the respective application program, and (ii) respective application authentication data for authenticating the first user with the respective application program. In accordance with example embodiments, the respective application ID data and respective application authentication data conform to the respective user-schema.

At block 506, the computing system receives user-input data including a user secret of the first user. The user input is received at an input/output (I/O) device of the computing system. As noted above, non-limiting examples of a user secret include a password or other character-based secret, as well as biometric data, such as a fingerprint or retinal scan, or other unique biometric identifier (e.g., facial recognition). As such, receiving the user-input data including a user secret of the first user may entail receiving a password and/or biometric identifying information of the first user.

At block 508, the computing system creates a first credentials data record containing at least the respective application ID data of the first user for each respective application program, the respective application authentication data of the first user for each respective application program, and an indication of the user secret of the first user.

At block 510, the computing system encrypts the first credentials data record with an encryption key of the computing system, and certifies the encrypted first credentials data record with a private key of the computing system.

Finally, at block 512, the computing system transfers, via the I/O device, the certified, encrypted first credentials data record to a first tangible, transportable storage medium external to the computing system.

In accordance with example embodiments, the method 500 may also include steps to create credentials for other users, besides the "first" user. Credentials for different users may not necessarily associate each user with the same set of applications. By way of example, additional steps below are described for creating credentials for a "second" user. It will be appreciated the process can be extended to any number of multiple users.

To create credentials for a second user, the computing system may receive a respective second user-data message transmitted from each respective application program of at least a subset of the one or more application programs. Each respective second user-data message is associated with the "second" user, and each includes (i) additional respective application ID data identifying the second user as a registered user of the respective application program, and (ii) additional respective application authentication data for authenticating the second user with the respective application program. In accordance with example embodiments, the additional respective application ID data and the additional respective application authentication data conform to the respective user-schema.

The computing system may next receive user-input data including a user secret of the second user. Again, the user-input data are received at the I/O device of the computing system, and can be any one or more of the types of user secrets described above.

The computing system next creates a second credentials data record containing at least the additional respective application ID data of the second user for each respective application program, the additional respective application authentication data of the second user for each respective application program, and an indication of the user secret of the second user.

The computing system then encrypts the second credentials data record with an encryption key of the computing system, and certifies the encrypted second credentials data record with a private key of the computing system.

Finally, the computing system transfers (via the I/O device) the certified, encrypted second credentials data record to a second tangible, transportable storage medium external to the computing system.

The method 600 of FIG. 6 is next described.

At block 602, the deployable wireless communication system receives a respective registration message from each respective application program of one or more application programs. The application programs are installed in and executing on one or more processors of the deployable wireless communication system. Each respective registration message includes a respective user-schema that defines data for identifying and authenticating any given individual user with the respective application program that sent the respective registration message. In an example embodiment, the deployable wireless communication system may receive respective registration messages as API calls from the respective applications. Other arrangements are possible as well.

At block 604, the deployable wireless communication system receives an encrypted first credentials data record transferred from a first tangible, transportable storage medium external to the deployable wireless communication system. The encrypted first credentials data record is associated with a particular user—a "first" user—and may be received at an input/output (I/O) device of the deployable wireless communication system.

At block 606, the deployable wireless communication system certifies authenticity of the encrypted first credentials data record using a public key of an external server that created the encrypted first credentials packet. In an example embodiment, the public key will have been stored ahead of time in the deployable wireless communication system.

At block 608, the deployable wireless communication system decrypts the certified encrypted first credentials data record using an encryption key of the external server that created the encrypted first credentials data record. In an example embodiment, the encryption key will have been stored ahead of time in the deployable wireless communication system.

At block 610, the deployable wireless communication system imports the first user's data for each respective application program. Specifically, for each respective application program, the deployable wireless communication system extracts from the decrypted, certified encrypted first credentials data record: (i) respective application ID data identifying a first user as a registered user of the respective application program, and (ii) respective application authentication data for authenticating the first user with the respective application program. In accordance with example embodiments, the respective application ID data and the respective application authentication data conform to the respective user-schema.

At block 612, the deployable wireless communication system extracts from the decrypted, certified encrypted first credentials data record an indication of a user secret of the first user.

At block 614, the deployable wireless communication system receives user-input data including a user secret of the first user. The user input is received at an input/output (I/O) device of the deployable wireless communication system. Again, non-limiting examples of a user secret include a password or other character-based secret, as well as biometric data, such as a fingerprint or retinal scan, or other unique biometric identifier (e.g., facial recognition). As such, receiving the user-input data including a user secret of the first user may entail receiving a password and/or biometric identifying information of the first user.

At block 616, the deployable wireless communication system a legitimate correspondence between the user secret of the first user and the indication of the user secret of the first user.

Finally, at block 618, in response to confirming the legitimate correspondence, the deployable wireless communication system provisions the first user. Specifically, for each respective application program, the deployable wireless communication system uses the respective application ID data and the respective application authentication data to provision the first user in the deployable wireless communication system as a registered user of the respective application program.

In accordance with example embodiments, the method 600 may also include steps to self-provision other users, besides the "first" user. By way of example, additional steps below are described for self-provisioning a "second" user. It will be appreciated the process can be extended to any number of multiple users.

To self-provision a second user, the deployable wireless communication system may receive (at the I/O device of the deployable wireless communication system) an encrypted second credentials data record transferred from a second tangible, transportable storage medium external to the deployable wireless communication system. The encrypted second credentials data record is associated with the "second" user.

The deployable wireless communication system may next certify authenticity of the encrypted second credentials data record using a public key of an external server that created the encrypted second credentials packet. The public key will have been stored in the deployable wireless communication system.

The deployable wireless communication system may then decrypt the certified encrypted second credentials data record using an encryption key of the external server that created the encrypted second credentials data record. The encryption key will have been stored in the deployable wireless communication system.

Next, the deployable wireless communication system imports the second user's data for each of those of the respective application programs with which the second user is associated. Specifically, for each respective application program of at least a subset of the one or more application programs, the deployable wireless communication system extracts from the decrypted, certified encrypted second credentials data record: (i) additional respective application ID data identifying a second user as a registered user of the respective application program, and (ii) additional respective application authentication data for authenticating the second user with the respective application program. In accordance with example embodiments, the additional respective application ID data and the additional respective application authentication data conform to the respective user-schema.

The deployable wireless communication system then extracts from the decrypted, certified encrypted second credentials data record an indication of a user secret of the second user.

The deployable wireless communication system receives user-input data including a user secret of the second user. The user input is received at the I/O device of the deployable wireless communication system.

Next, the deployable wireless communication system confirms a legitimate second correspondence between the user secret of the second user and the indication of the user secret of the second user.

Finally, in response to confirming the legitimate correspondence, the deployable wireless communication system provisions the second user. Specifically, in response to confirming the legitimate second correspondence, for each respective application program of the subset of the one or more application programs, the deployable wireless communication system uses the additional respective application ID data and the additional respective application authentication data to provision the second user in the deployable wireless communication system as a registered user of the respective application program.

The example computing devices, platforms, network entities, and the like described above represent individually and/or collectively device means for carrying out the various operations, functions, and methods described herein. Similarly, the example methods described in connection with FIGS. 5 and 6 represent operational means, when made operational on one or more of the device means, for implementing the various example embodiments described herein.

V. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system disposed within a wireless communication system, the computing system comprising:
    an input/output (I/O) device;
    one or more processors;
    memory; and program instructions, stored in the memory, that upon execution by the one or more processors cause the computing system to perform operations including:
receiving a first registration message transmitted from a first application program installed in and executing on one or more servers communicatively connected with the wireless communication system, wherein the first registration message includes a first user-schema that defines data for identifying and authenticating any given individual user with the first application program;
receiving a first user-data message transmitted from the first application program, wherein the first user-data message includes (i) first-application ID data identifying a first user as a registered user of the first application program, and (ii) first-application authentication data for authenticating the first user with the first application program, the first-application ID data and first-application authentication data conforming to the first user-schema;
receiving at the I/O device user-input data including a user secret of the first user;
creating a first credentials data record containing at least the first-application ID data of the first user, the first-application authentication data of the first user, and an indication of the user secret of the first user;
encrypting the first credentials data record with an encryption key of the computing system, and certifying the encrypted first credentials data record with a private key of the computing system; and
transferring via the I/O device the certified, encrypted first credentials data record to a first tangible, transportable storage medium external to the computing system.

2. The computing system of claim 1, wherein the operations further include:
receiving a second user-data message transmitted from the first application program, wherein the second user-data message includes (i) additional first-application ID data identifying a second user as a registered user of the first application program, and (ii) additional first-application authentication data for authenticating the second user with the first application program, the additional first-application ID data and the additional first-application authentication data conforming to the first user-schema;
receiving at the I/O device user-input data including a user secret of the second user;
creating a second credentials data record containing at least the additional first-application ID data of the second user, the additional first-application authentication data of the second user, and an indication of the user secret of the second user;
encrypting the second credentials data record with an encryption key of the computing system, and certifying the encrypted second credentials data record with a private key of the computing system; and
transferring via the I/O device the certified, encrypted second credentials data record to a second tangible, transportable storage medium external to the computing system.

3. The computing system of claim 1, wherein the operations further include:
receiving a second registration message transmitted from a second application program installed in and executing on one or more servers communicatively connected with the wireless communication system, wherein the second registration message includes a second user-schema that defines data for identifying and authenticating any given individual user with the second application program;
receiving an additional first user-data message transmitted from the second application program, wherein the additional first user-data message includes (i) second-application ID data identifying the first user as a registered user of the second application program, and (ii) second-application authentication data for authenticating the first user with the second application program, the second-application ID data and second-application authentication data conforming to the second user-schema; and
prior to encrypting and certifying the first credentials data record, augmenting the first credentials data record with the second-application ID data of the first user, and the second-application authentication data of the first user.

4. The computing system of claim 1, wherein receiving the first registration message comprises receiving a first application program interface call from the first application program.

5. The computing system of claim 1, wherein receiving at the I/O device user-input data including the user secret of the first user comprises receiving biometric identifying information of the first user.

6. The computing system of claim 1, wherein the first tangible, transportable storage medium is one of: a flash drive, a QR-code tag, an RFID, a USB storage device, or internal storage on a smartphone.

7. A computing system disposed within a deployable wireless communication system, the computing system comprising:
an input/output (I/O) device;
one or more processors;
memory; and
program instructions, stored in the memory, that upon execution by the one or more processors cause the computing system to perform operations including:
receiving a first registration message from a first application program installed in and executing on one or more processors of the deployable wireless communication system, wherein the first registration message includes a first user-schema that defines data for identifying and authenticating any given individual user with the first application program;
receiving at the I/O device an encrypted first credentials data record transferred from a first tangible, transportable storage medium external to the deployable wireless communication system;
certifying authenticity of the encrypted first credentials data record using a public key of an external server that created the encrypted first credentials packet, the public key having been stored in the computing system;
decrypting the certified encrypted first credentials data record using an encryption key of the external server that created the encrypted first credentials data record, the encryption key having been stored in the computing system;
extracting from the decrypted, certified encrypted first credentials data record: (i) first-application ID data identifying a first user as a registered user of the first application program, (ii) first-application authentication data for authenticating the first user with the first application program, and (iii) an indication of a user secret of the first user, wherein the first-application ID data and first-application authentication data conform to the first user-schema;

receiving at the I/O device user-input data including the user secret of the first user;

confirming a legitimate first correspondence between the user secret of the first user and the indication of the user secret of the first user; and in response to confirming the legitimate first correspondence, using the first-application ID data and the first-application authentication data to provision the first user in the deployable wireless communication system as a registered user of the first application program.

8. The computing system of claim 7, wherein the operations further include:

receiving at the I/O device an encrypted second credentials data record transferred from a second tangible, transportable storage medium external to the deployable wireless communication system;

certifying authenticity of the encrypted second credentials data record using a public key of an external server that created the encrypted second credentials packet, the public key having been stored in the computing system;

decrypting the certified encrypted second credentials data record using an encryption key of the external server that created the encrypted second credentials data record, the encryption key having been stored in the computing system;

extracting from the decrypted, certified encrypted second credentials data record: (i) additional first-application ID data identifying a second user as a registered user of the first application program, (ii) additional first-application authentication data for authenticating the second user with the first application program, and (iii) an indication of a user secret of the second user, wherein the additional first-application ID data and the additional first-application authentication data conform to the first user-schema;

receiving at the I/O device user-input data including the user secret of the second user;

confirming a legitimate second correspondence between the user secret of the second user and the indication of the user secret of the second user; and in response to confirming the legitimate second correspondence, using the additional first-application ID data and the additional first-application authentication data to provision the second user in the deployable wireless communication system as a registered user of the first application program.

9. The computing system of claim 7, wherein the operations further include:

receiving a second registration message from a second application program installed in and executing on the one or more processors of the deployable wireless communication system, wherein the second registration message includes a second user-schema that defines data for identifying and authenticating any given individual user with the second application program;

extracting from the decrypted, certified encrypted first credentials data record: (i) second-application ID data identifying the first user as a registered user of the second application program, and (ii) second-application authentication data for authenticating the first user with the second application program, wherein the second-application ID data and second-application authentication data conform to the second user-schema; and in further response to confirming the legitimate first correspondence, using the second-application ID data and the second-application authentication data to provision the first user in the deployable wireless communication system as a registered user of the second application program.

10. The computing system of claim 7, wherein receiving the first registration message comprises receiving a first application program interface call from the first application program.

11. The computing system of claim 7, wherein receiving at the I/O device user-input data including the user secret of the first user comprises receiving biometric identifying information of the first user.

12. The computing system of claim 7, wherein the first tangible, transportable storage medium is one of: a flash drive, a QR-code tag, an RFID, a USB storage device, or internal storage on a smartphone.

13. A method carried out by a computing system disposed within a wireless communication system, the method comprising:

receiving a respective registration message transmitted from each respective application program of one or more application programs installed in and executing on one or more servers communicatively connected with the wireless communication system, wherein each respective registration message includes a respective user-schema that defines data for identifying and authenticating any given individual user with the respective application program that transmitted the respective registration message;

receiving a respective first user-data message transmitted from each respective application program, wherein each respective first user-data message includes (i) respective application ID data identifying a first user as a registered user of the respective application program, and (ii) respective application authentication data for authenticating the first user with the respective application program, the respective application ID data and respective application authentication data conforming to the respective user-schema;

receiving at an input/output (I/O) device of the computing system user-input data including a user secret of the first user;

creating a first credentials data record containing at least the respective application ID data of the first user for each respective application program, the respective application authentication data of the first user for each respective application program, and an indication of the user secret of the first user;

encrypting the first credentials data record with an encryption key of the computing system, and certifying the encrypted first credentials data record with a private key of the computing system; and transferring via the I/O device the certified, encrypted first credentials data record to a first tangible, transportable storage medium external to the computing system.

14. The method of claim 13, further comprising:

receiving a respective second user-data message transmitted from each respective application program of at least a subset of the one or more application programs, wherein each respective second user-data message includes (i) additional respective application ID data identifying a second user as a registered user of the respective application program, and (ii) additional respective application authentication data for authenticating the second user with the respective application program, the additional respective application ID data and the additional respective application authentication data conforming to the respective user-schema;

receiving at the I/O device of the computing system user-input data including a user secret of the second user;

creating a second credentials data record containing at least the additional respective application ID data of the second user for each respective application program, the additional respective application authentication data of the second user for each respective application program, and an indication of the user secret of the second user;

encrypting the second credentials data record with an encryption key of the computing system, and certifying the encrypted second credentials data record with a private key of the computing system; and transferring via the I/O device the certified, encrypted second credentials data record to a second tangible, transportable storage medium external to the computing system.

15. The method of claim 13, wherein receiving the respective registration message transmitted from each respective application program of the one or more application programs comprises receiving a respective application program interface call from each respective application program of the one or more application programs.

16. The method of claim 13, wherein receiving at the I/O device of the computing system user-input data including a user secret of the first user comprises receiving biometric identifying information of the first user.

17. A method carried out by a deployable wireless communication system, the method comprising:
  receiving a respective registration message from each respective application program of one or more application programs installed in and executing on one or more processors of the deployable wireless communication system, wherein each respective registration message includes a respective user-schema that defines data for identifying and authenticating any given individual user with the respective application program that sent the respective registration message;
  receiving at an input/output (I/O) device of the deployable wireless communication system an encrypted first credentials data record transferred from a first tangible, transportable storage medium external to the deployable wireless communication system;
  certifying authenticity of the encrypted first credentials data record using a public key of an external server that created the encrypted first credentials packet, the public key having been stored in the deployable wireless communication system;
  decrypting the certified encrypted first credentials data record using an encryption key of the external server that created the encrypted first credentials data record, the encryption key having been stored in the deployable wireless communication system;
  for each respective application program, extracting from the decrypted, certified encrypted first credentials data record: (i) respective application ID data identifying a first user as a registered user of the respective application program, and (ii) respective application authentication data for authenticating the first user with the respective application program, wherein the respective application ID data and the respective application authentication data conform to the respective user-schema;
  extracting from the decrypted, certified encrypted first credentials data record an indication of a user secret of the first user;
  receiving at the I/O device user-input data including the user secret of the first user;
  confirming a legitimate first correspondence between the user secret of the first user and the indication of the user secret of the first user; and
  in response to confirming the legitimate first correspondence, for each respective application program, using the respective application ID data and the respective application authentication data to provision the first user in the deployable wireless communication system as a registered user of the respective application program.

18. The method of claim 17, wherein the operations further include:
  receiving at the I/O device an encrypted second credentials data record transferred from a second tangible, transportable storage medium external to the deployable wireless communication system;
  certifying authenticity of the encrypted second credentials data record using a public key of an external server that created the encrypted second credentials packet, the public key having been stored in the deployable wireless communication system;
  decrypting the certified encrypted second credentials data record using an encryption key of the external server that created the encrypted second credentials data record, the encryption key having been stored in the deployable wireless communication system;
  for each respective application program of at least a subset of the one or more application programs, extracting from the decrypted, certified encrypted second credentials data record: (i) additional respective application ID data identifying a second user as a registered user of the respective application program, and (ii) additional respective application authentication data for authenticating the second user with the respective application program, wherein the additional respective application ID data and the additional respective application authentication data conform to the respective user-schema;
  extracting from the decrypted, certified encrypted second credentials data record an indication of a user secret of the second user;
  receiving at the I/O device user-input data including the user secret of the second user;
  confirming a legitimate second correspondence between the user secret of the second user and the indication of the user secret of the second user; and
  in response to confirming the legitimate second correspondence, for each respective application program of the subset of the one or more application programs, using the additional respective application ID data and the additional respective application authentication data to provision the second user in the deployable wireless communication system as a registered user of the respective application program.

19. The method of claim 17, wherein receiving the respective registration message from each respective application program of the one or more application programs comprises receiving a respective application program interface call from each respective application program of the one or more application programs.

20. The method of claim 17, wherein receiving at the I/O device user-input data including the user secret of the first user comprises receiving biometric identifying information of the first user.

* * * * *